United States Patent [19]

Rencontre

[11] Patent Number: 5,200,598
[45] Date of Patent: Apr. 6, 1993

[54] OPTICAL READER

[76] Inventor: Stephen C. Rencontre, 30A Moreland Avenue, Croydon, England, CR0 6EA

[21] Appl. No.: 613,914
[22] PCT Filed: Jun. 29, 1989
[86] PCT No.: PCT/GB89/00727
  § 371 Date: Dec. 11, 1990
  § 102(e) Date: Dec. 11, 1990
[87] PCT Pub. No.: WO90/00292
  PCT Pub. Date: Jan. 11, 1990

[30] Foreign Application Priority Data
  Jun. 29, 1988 [GB] United Kingdom ............... 8815490

[51] Int. Cl.$^5$ ............................................ G06K 9/03
[52] U.S. Cl. ................................ 235/472; 235/437; 235/462; 382/12; 382/46; 382/47
[58] Field of Search .............. 235/454, 435, 456, 437, 235/462, 494, 472; 382/46, 47, 12

[56] References Cited

U.S. PATENT DOCUMENTS

| | | | |
|---|---|---|---|
| 3,852,573 | 12/1974 | Doich | 235/61.11 |
| 4,163,157 | 7/1979 | Guignard et al. | 250/561 |
| 4,251,800 | 2/1981 | Sanner et al. | 340/146.3 |
| 4,588,882 | 3/1986 | Buxton | 235/487 |
| 4,618,991 | 6/1986 | Tabata et al. | 382/46 |
| 4,634,850 | 1/1987 | Pierce et al. | 235/462 |
| 4,652,730 | 3/1987 | Marshall | 235/456 |
| 4,692,603 | 9/1987 | Brass et al. | 235/454 |
| 4,723,297 | 2/1988 | Postl | 382/46 |
| 4,743,773 | 5/1988 | Katana et al. | 235/472 |
| 4,754,127 | 6/1988 | Brass et al. | 235/456 |
| 4,777,357 | 10/1988 | Harada et al. | 235/462 |
| 4,860,275 | 8/1989 | Kakinuma et al. | 235/456 |
| 4,866,784 | 9/1989 | Barski | 382/46 |
| 4,873,426 | 10/1989 | Sarna et al. | 235/462 |
| 4,941,189 | 7/1990 | Britt | 382/46 |
| 5,027,227 | 6/1991 | Kita | 382/46 |
| 5,093,653 | 3/1992 | Ikehira | 382/44 |

FOREIGN PATENT DOCUMENTS 2027963A 2/1980 United Kingdom .

Primary Examiner—Eugene R. LaRoche
Assistant Examiner—Tan Nguyen
Attorney, Agent, or Firm—Nixon & Vanderhye

[57] ABSTRACT

An optical reader for reading high density dibit encoded data from a data strip comrpises an optical detector (13) and a detector (14,15,DSP) connected to the optical detector (13) and arranged to decode its output. The detector includes a row of photosensitive elements arranged to extend transversely across a row of dibits and to form an image of the row of dibits. The decoder (14,15,DSP) includes a buffer (15) arranged to store the row image. An image transform device detects a skew angle of the strip and transforms the stored image to compensate for the distortion of the image.

12 Claims, 10 Drawing Sheets

OPTICAL READER

The present invention relates to a reader for optically encoded data and in particular to a reader for data encoded using the SOFTSTRIP format.

Using the SOFTSTRIP format data is encoded on a carrier such as a strip of paper or card as rows of dibits, each dibit comprising a rectangular region which is divided in two with one half black and the other half white. A white-black combination is used to code for one binary value and a black-white combination used for the other binary value. A series of such rows are printed one after the other along the length of the data strip. A headed having a predefined format is printed at the start of the strip. Each row of dibits is bounded by alignment dibits which form respectively a checkerboard and rack alignment patterns extending longitudinally down the edge of the strip.

To recover data from such a data strip an optical reader is required which translates the variation in light intensity from the dibits into an electrical signal and then decodes the signal appropriately to recover the data.

U.S. Pat. No. 4,692,603 discloses one example of an optical reader for data strips. The reader includes a guide which receives and aligns a substrate bearing the data strip. The data strip is fed past a scanning head bearing a number of lenses. The lenses scan across the row of dibits to focus light from successive dibits onto a photodetector. If the data strip is tilted with respect to the reader then dibits from different rows may be read in a single scan, causing corruption of the data. To avoid this, this prior art system includes a number of mechanisms to eliminate tilt. On start-up the scanner first moves along the header section of the strip in one direction and then reverses moving back up the strip, while scanning all the time. Logic circuitry is provided to determine from the output of the scanner during this alignment procedure the angle of tilt of the strip. A tilt adjustment motor is then activated to move the strip relative to the reader to correct the tilt. The start-up procedure is then repeated until the strip is satisfactorily aligned.

SUMMARY OF THE INVENTION

According to the present invention, an optical reader for reading high density dibit encoded data from a data strip comprising an optical detector and a decoder connected to the optical detector and arranged to decode the output from the optical detector is characterised in that the optical detector includes a row of photo sensitive elements arranged to extend transversely across a row of debits and to form an image of the row of bidits and in that decoder buffer means arranged to store the image, and image transform means arranged to detect a skew angle of the reader relative to the strip and to transform the image stored in the buffer means to compensate for the distortion of the image in accordance with the skew angle.

The present invention provides an optical reader with many advantages over the prior art systems. By using a detector capable of imaging an entire row of dibits at a time it removes the need to physically scan the row. As a result the reader of the present invention is markedly more simple both mechanically and optically with consequent savings in cost and advantages in terms of reliability. A further important advantage of the present invention is that means are provided to correct for any distortion in the image resulting from tilting of the data strip. It is therefore not necessary with the reader of the present invention to provide a guide to hold the strip in a predetermined orientation with respect to the reader nor to provide a tilt adjustment mechanism to shift the strip with respect to the reader.

The relative insensitivity of the reader of the present invention to the alignment of the strip makes it particularly suitable for use as a hand-held device.

Preferably the optical detector comprises a CCD array.

Preferably the image transform means include a one-dimensional image resampling sequencer arranged to receive image data from the buffer means and to apply to the image data a transform:

$$x = V_0 + Au$$

Where $(u,v)$ are the lateral and longitudinal coordinates respectively of the raw image data held in the buffer and x is the lateral coordinate of the coordinate system of the transformed image.

To correct for the skew in the image data it is necessary to carry out a transform on the two-dimensional input image. However since in practice the required transform is a pure shear parallel to the y-axis only one of the two dimensions is mapped in non-trivial way. The transform as a whole may be termed a "$1\frac{1}{2}$-dimensional" transform and is carried out using a single one-dimensional image re-sampling sequencer.

Preferably the transform means are arranged to determine an appropriate initial value for the transform coefficient A by detecting a first appearance of the data strip header in the imaged row, counting the number of scans between the first detection of the header and the first subsequent scan which completely crosses the header.

Preferably the decoder means are arranged during the reading of data to detect transitions in the alignment dibits bounding the transformed row images, and when a transition is detected in one only of the dibits to add a predetermined correction $\delta$ to the transform coefficient A and to resample and transform the current row.

The speed of the image sampling and transform process is such that one an initial value for the transform coefficient A has been set in accordance with the detected skew angle any subsequent variation in the skew angle can be detected and corrected by a simple feedback mechanism with out in general requiring the recalculation from scratch of the skew angle and transform coefficient.

Preferably the reader is hand-held device arranged to be moved along a data strip with the CCD array in contact with the strip, the reader including a source of light offset from the CCD array and arranged to illuminate the region of contact between the CCD array and the data strip.

Preferably the reader includes an A/D converter arranged to digitise signals from the CCD array and to provide an output for the buffer means, the reader being arranged to detect a black reference output by the CCD array and to set a reference voltage for the A/D converter in accordance with the output level of the CCD array.

BRIEF DESCRIPTION OF THE DRAWINGS

An optical reader in accordance with the present invention will now be described in detail with reference to the figures of the accompanying drawings in which.

DETAILED DISCUSSION OF PREFERRED EMBODIMENTS

Figure 1:
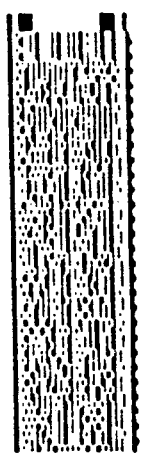
FIG. 1 is a first example of data strip.
Figure 2:
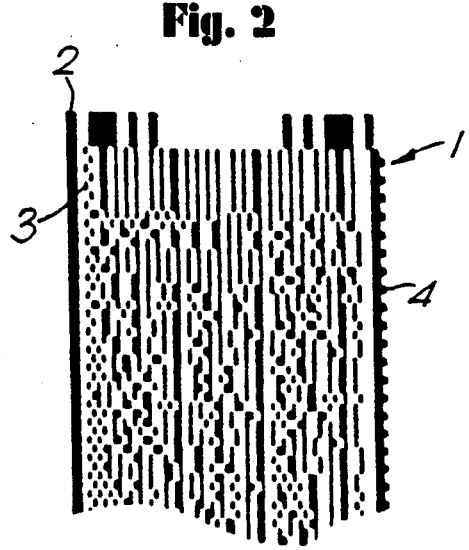
FIG. 2 is a second example of a data strip

FIG. 1 shows a typical example of a SOFTSTRIP and FIG. 2 shows an enlarged detailed from the head of such a strip. The features of the strip of particular significance for the present invention are the header portion 1, the black reference strip 2 which runs along the edge of the strip and the alignment dibits 3, 4 which bound the edges of the dibit rows forming checker board and rack patterns respectively.

Figure 3:
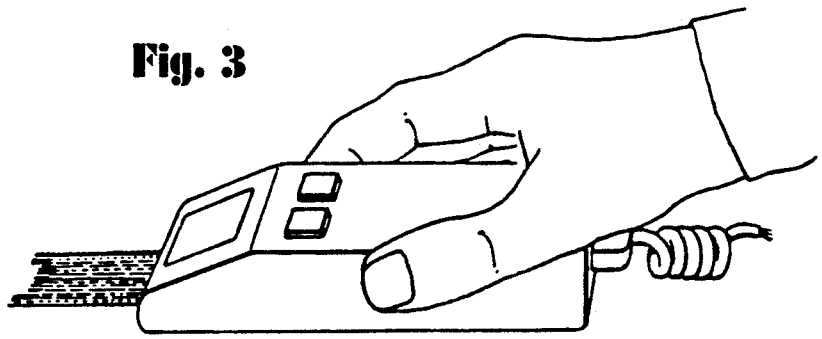
FIG. 3 is a perspective view a first example of an optical reader in accordance with the present invention.
Figure 4:
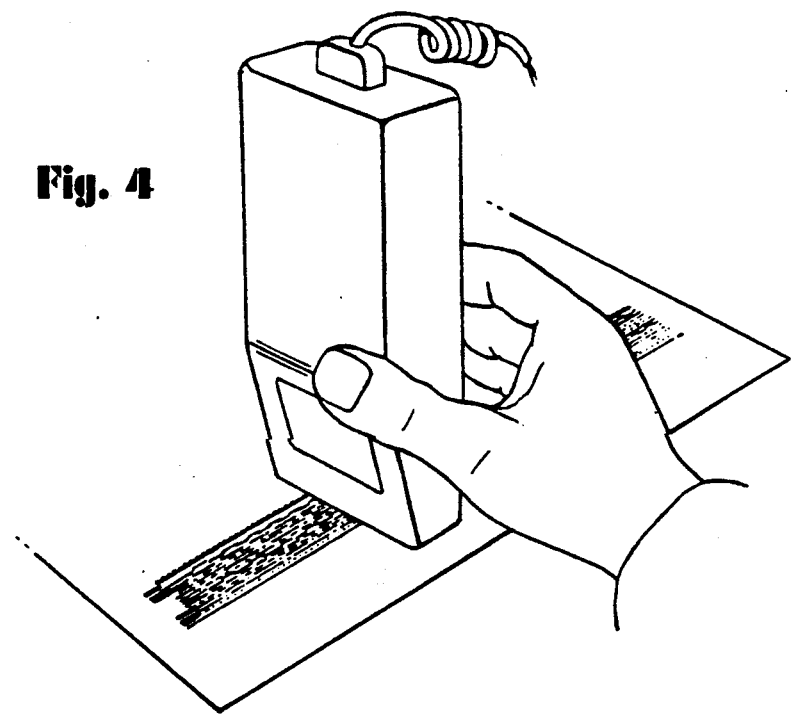
FIG. 4 is a perspective view of a second example of an optical reader in accordance with this invention.

FIGS. 3 and 4 are examples of the application of the invention in a hand-held device.

SOFTSTRIP datastrips are described in further detail in the above cited U.S. Patent and also in U.S. Pat. Nos. 4,754,127 4,782,221 and 4,728,783. The format for endoding data is defined in the publication "field specifications" published by Cauzin Systems Inc. Waterbury, Conn., U.S.A. SOFTSTRIP is a trademark of Cauzin Systems Inc.

Figure 6A:
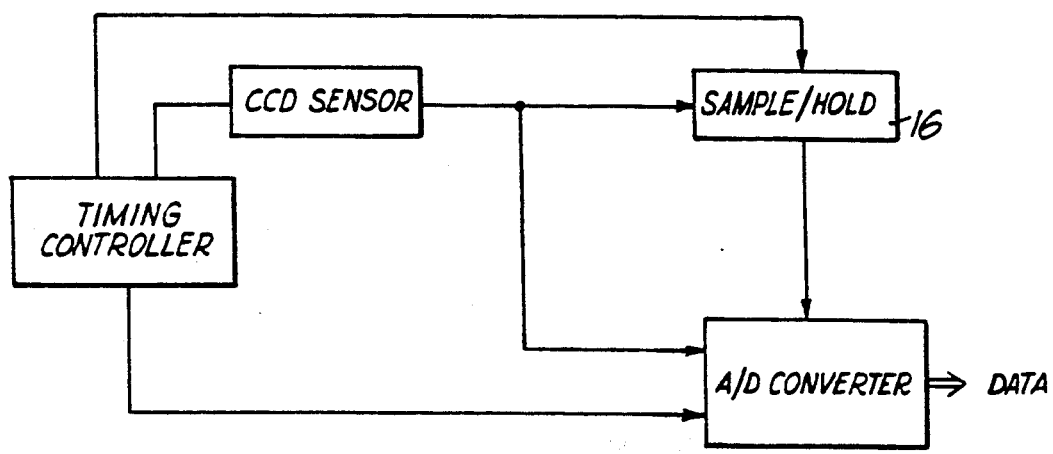
FIGS. 6a and 6b show an A/D converter used in the present invention and the output of an CCD array respectively.
Figure 6B:
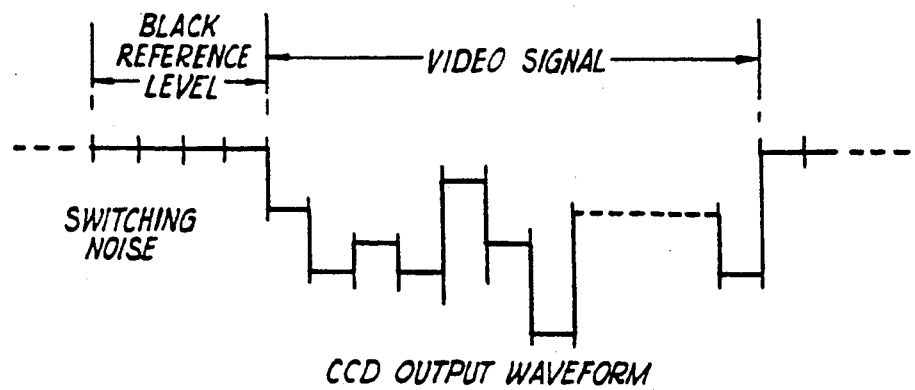

FIG. 6B is the output waveform of the CCD sensor, shown as voltage against time.

Figure 7:
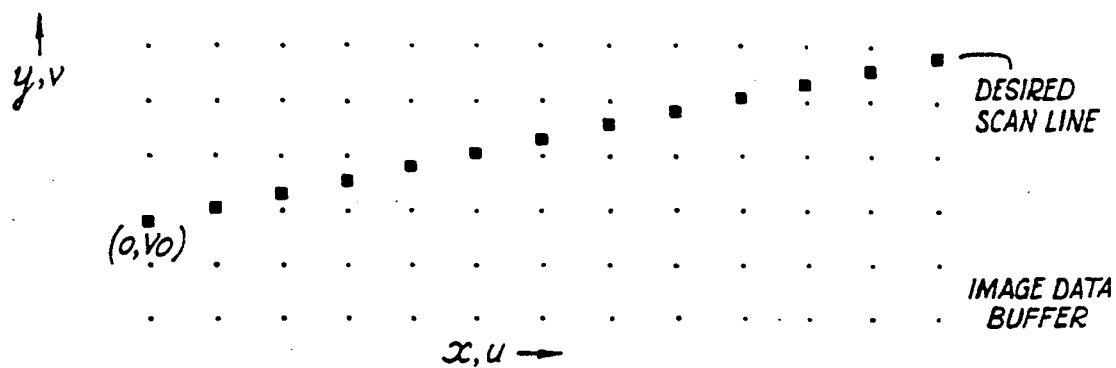
FIG. 7 shows a skewed row image.

FIG. 7 is a diagrammatic representation of the image stored in the buffer. Dots represent actual data points stored in columns (representing points with a scan) organized into rows (representing successive scans). The black squares mark the theoretical locations in this matrix of a desired sequence of data points representing the line of an idealized scan, in which there is no relative angular error between physical scan lines and the data.

Figure 8:
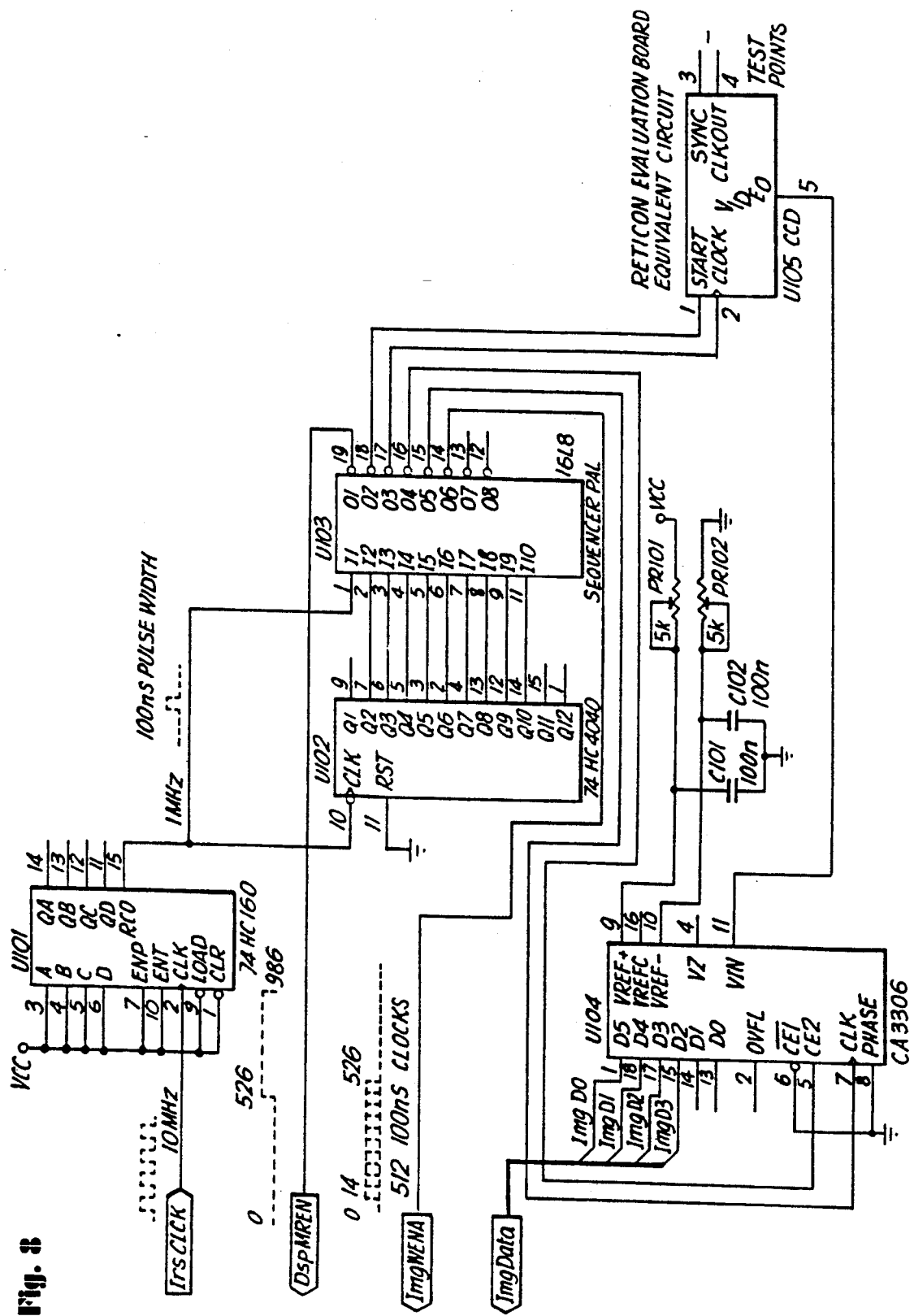
FIG. 8 is a circuit diagram of a scanner.

FIG. 8 is an example of circuitry to generate the control and timing signals needed by the CCD sensor array.

Figure 9A:
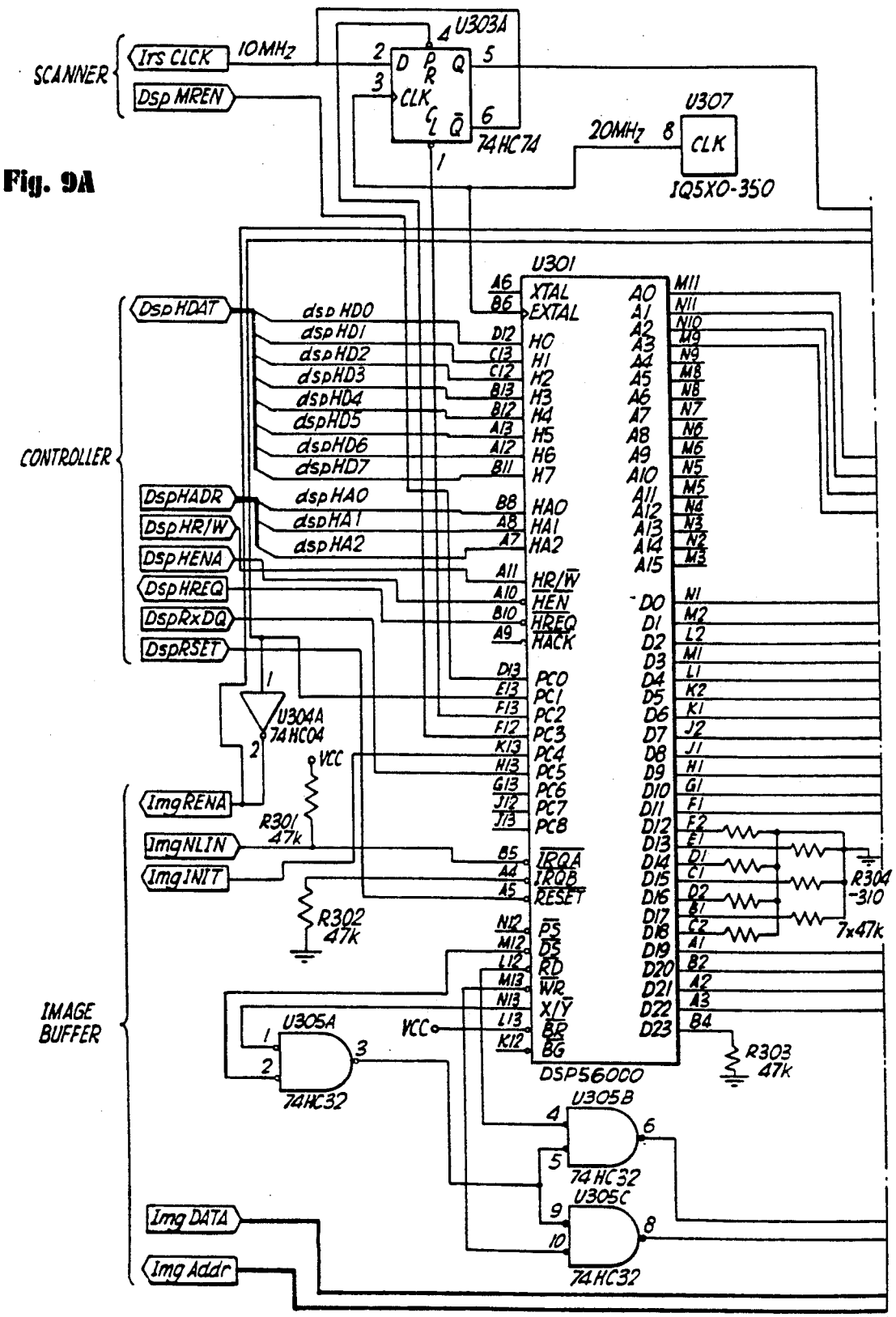
FIG. 9 is a circuit diagram of a digital signal processor.
Figure 9B:
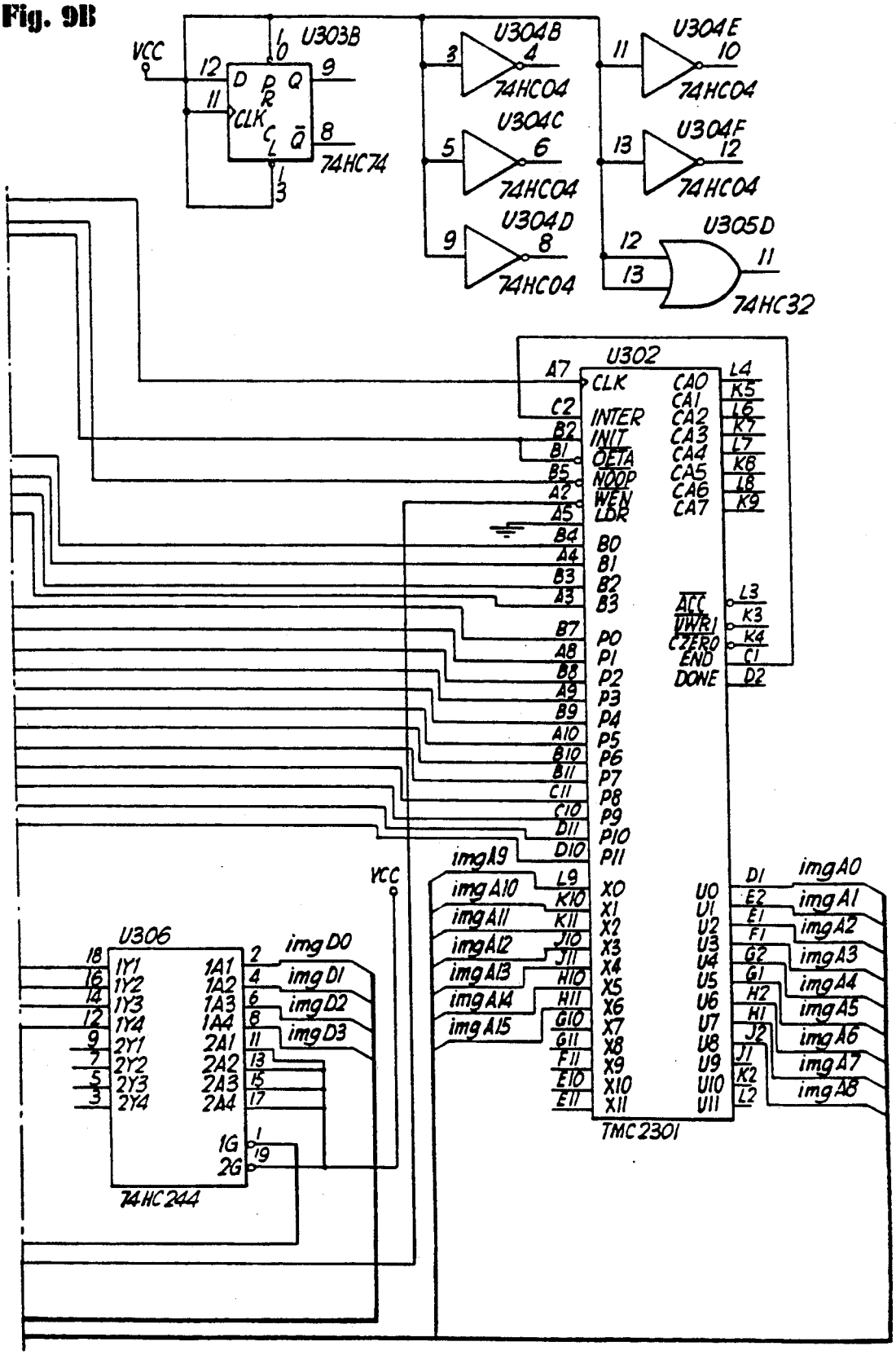

FIGS. 9A and B are an example of circuitry for the digital signal processor (DSP) and image resampling sequencer (IRS) which decode the data lines.

Figure 10A:
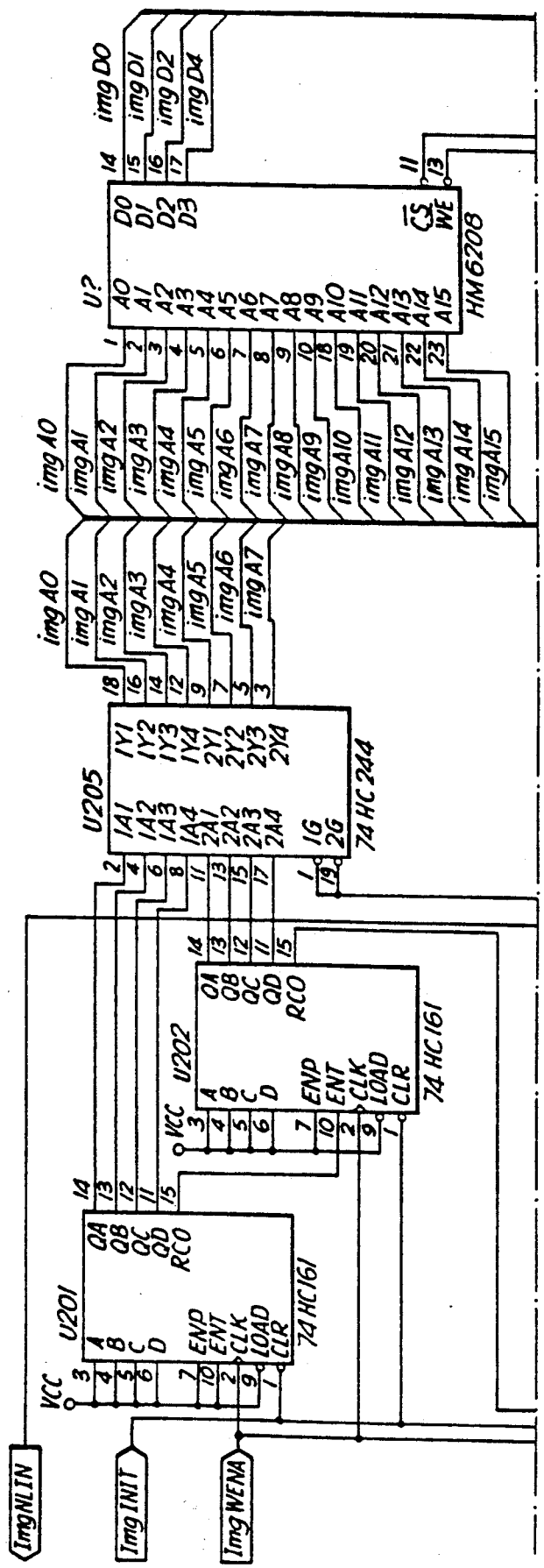
FIG. 10 is a circuit diagram of an image buffer.
Figure 10B:
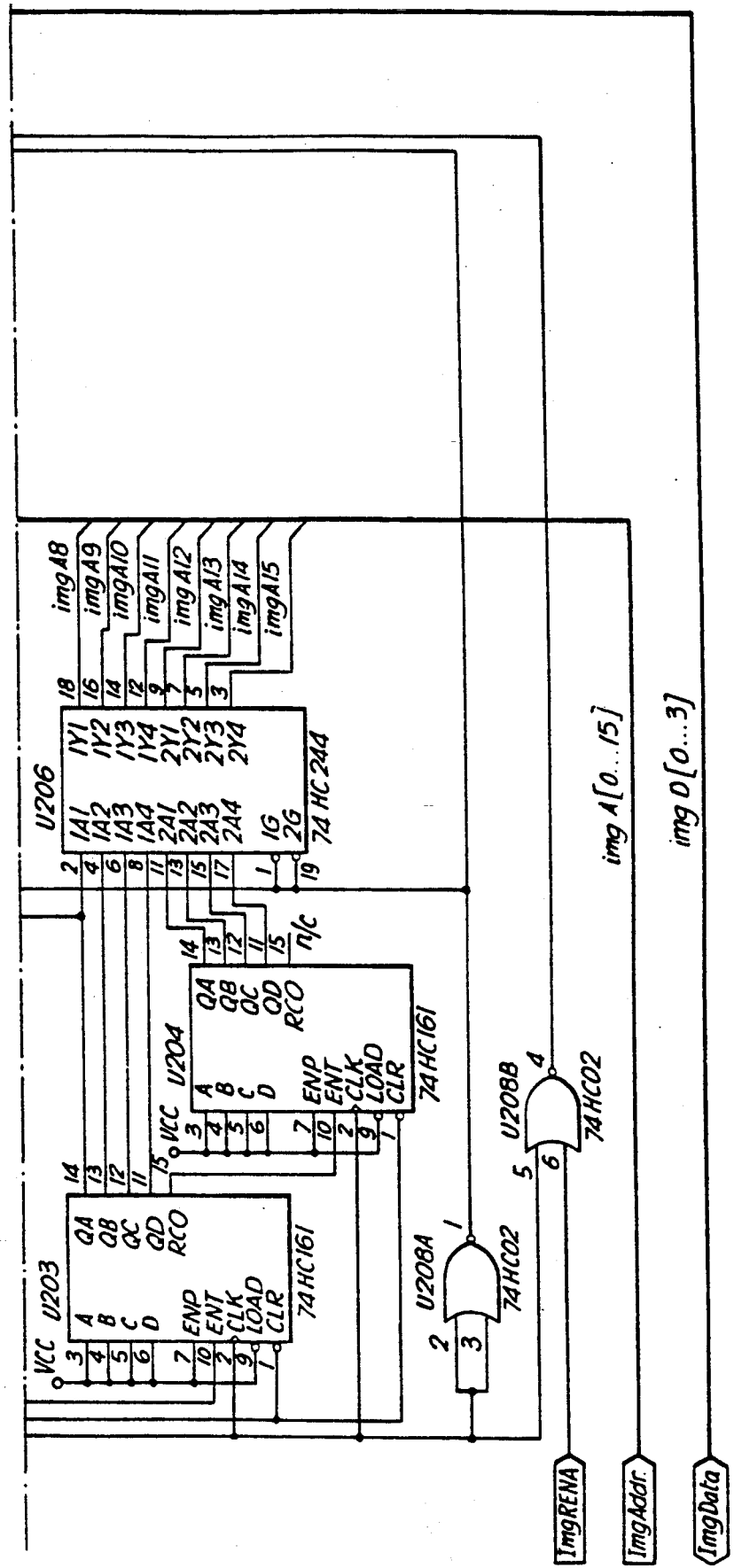

FIGS. 10A and B are an example of circuitry for the image buffer memory and interface to the IRS.

Figure 11A:
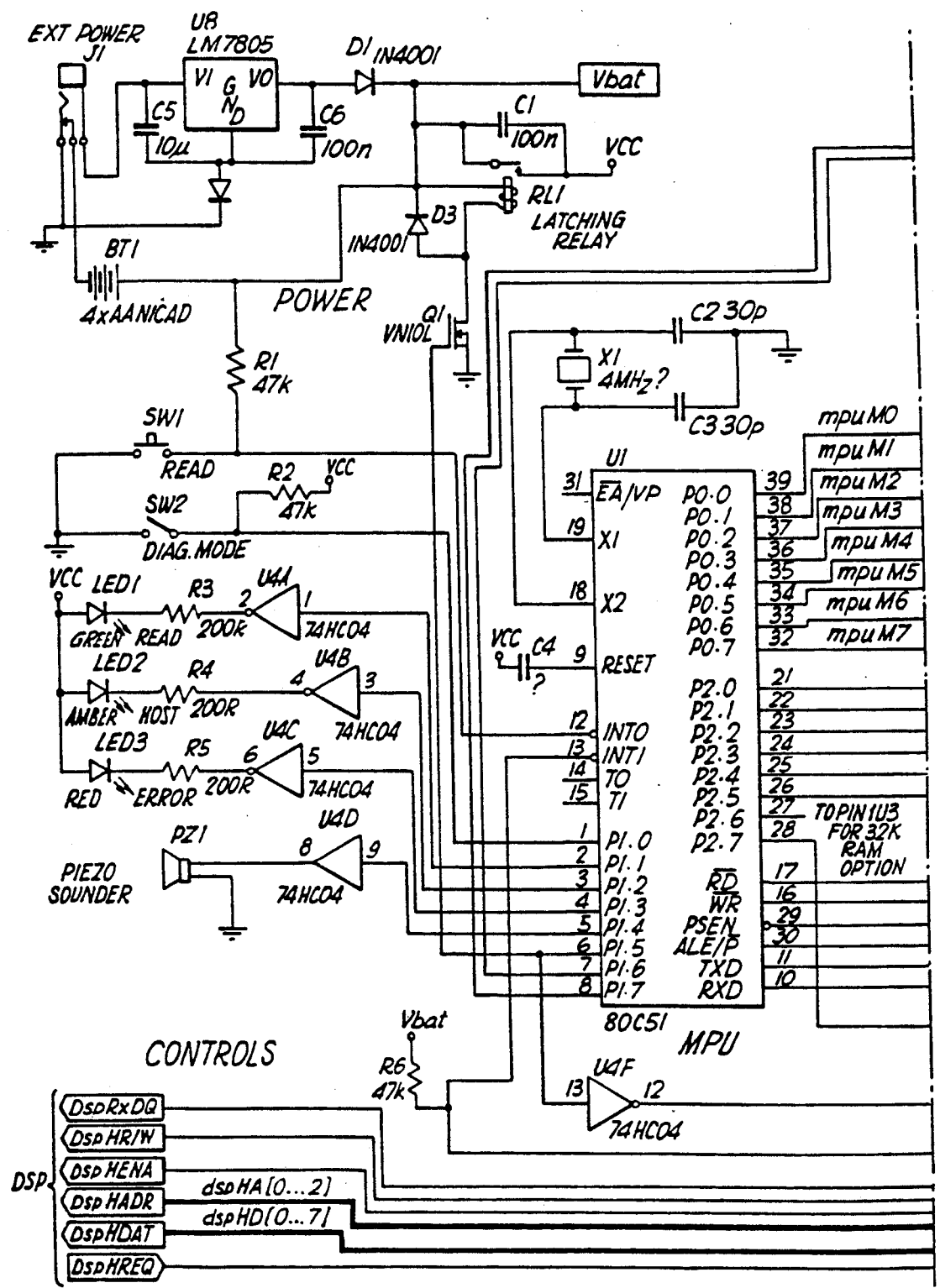
FIG. 11 is a circuit diagram of a controller.
Figure 11B:
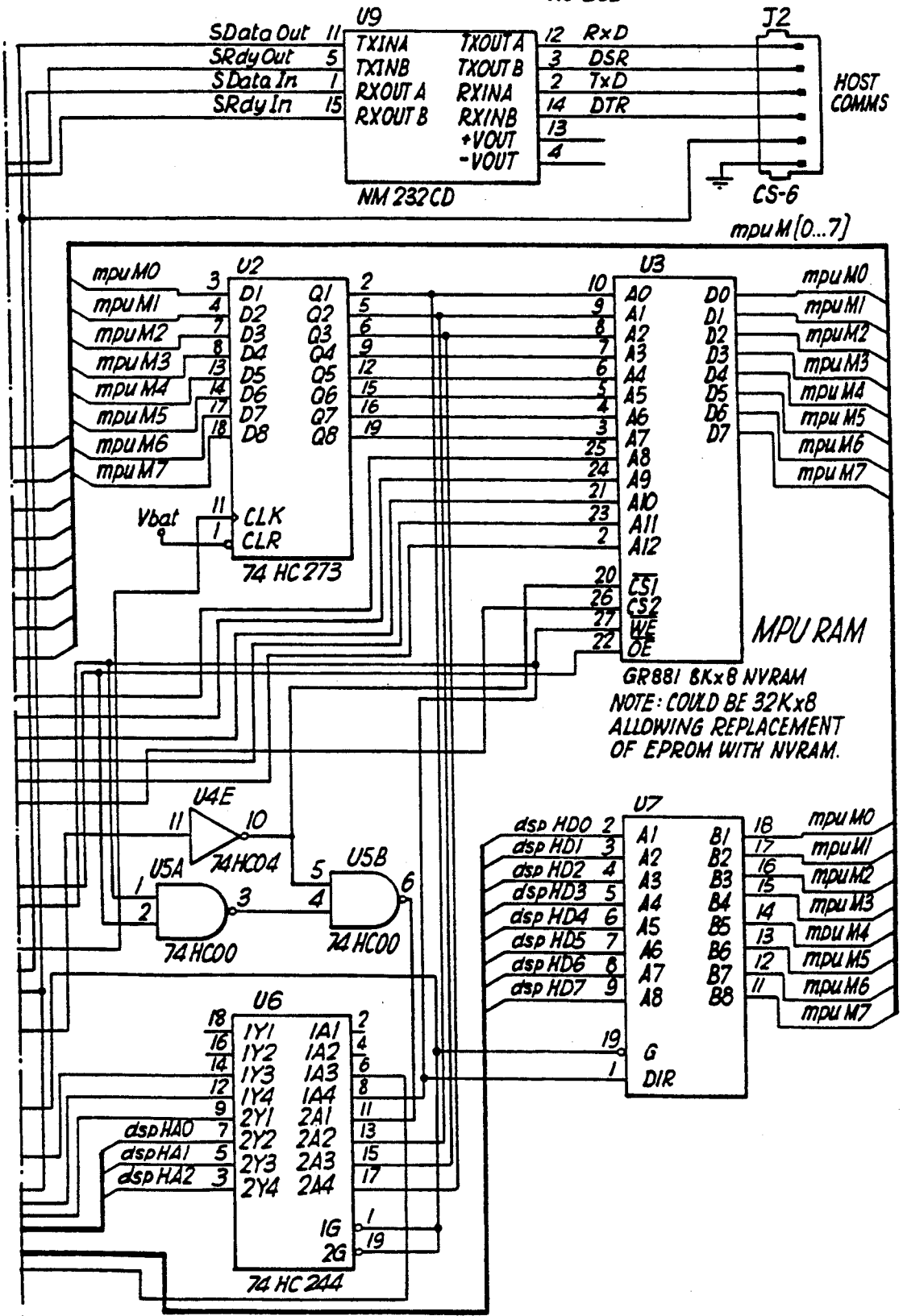

FIGS. 11A and B are an example of circuitry for the microcontroller which performs the overall control of the system and provides interfaces to external devices and the user.

Figure 5:
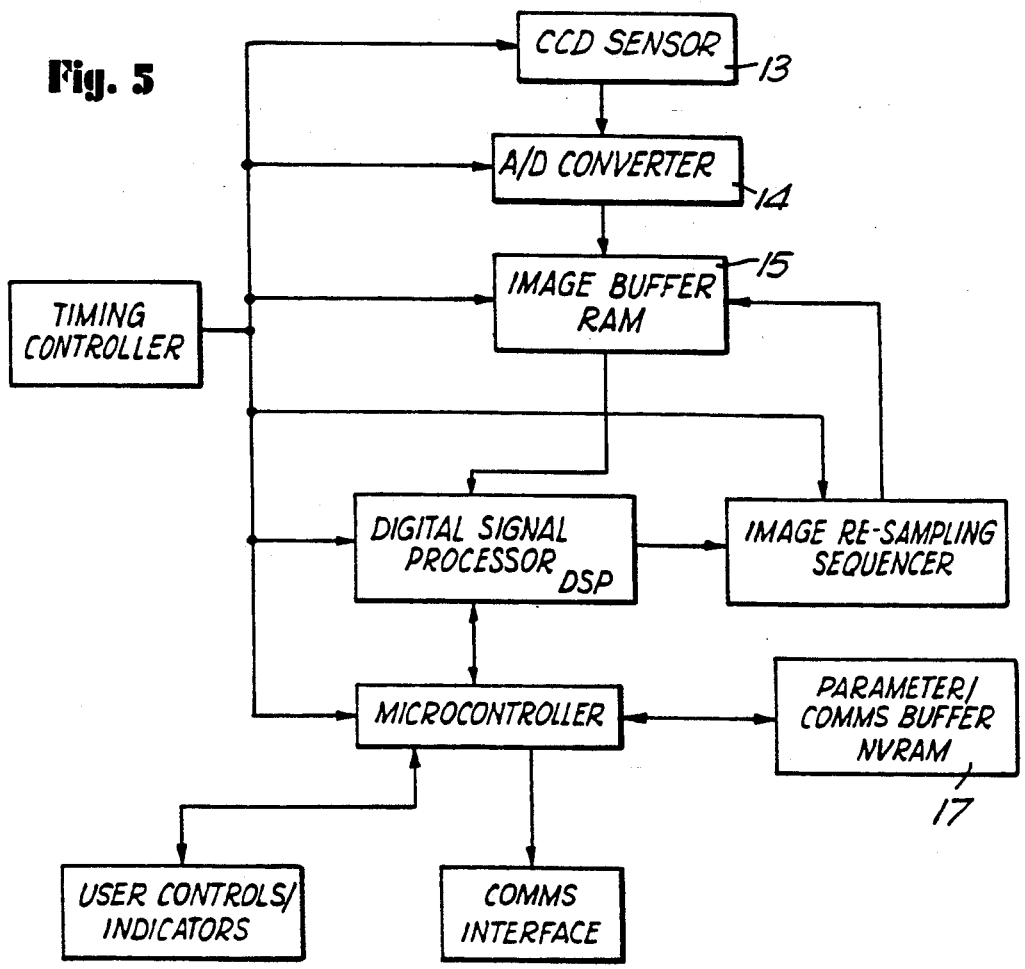
FIG. 5 is a block diagram of such a reader.
Figure 12:
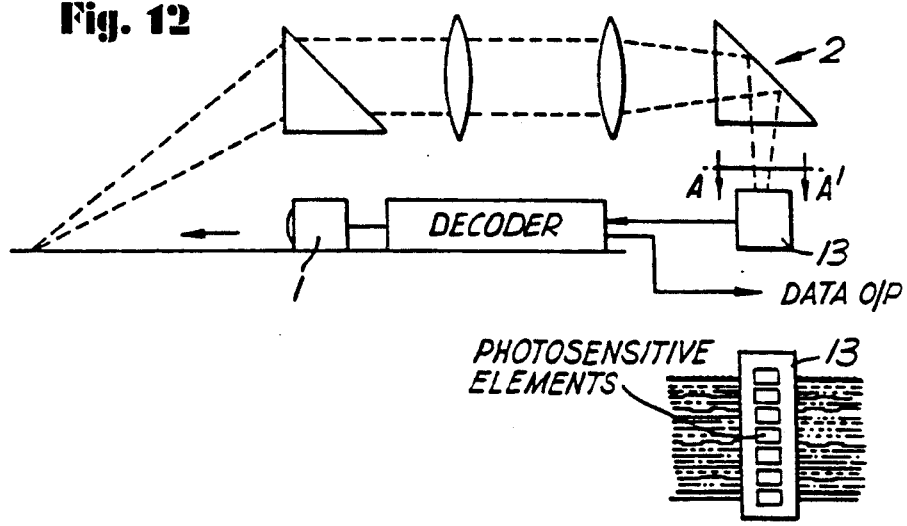
FIG. 12 is a diagram showing the arrangement of components in a reader.

In this preferred example the reader is hand held and in use is moved along a data strip printed on a substrate formed of card, paper or plastic with a reading head in contact with the substrate. As shown in FIG. 12, the region of contact between the reader and the substrate is illuminated by a lamp 1. An optical system 2 comprising prisms and an objective lens focuses the image of the strip on a CCD sensor array. The output of the CCD sensor array 13 is digitised by an A/D converter 14 and then applied to an image buffer than 15. As shown in FIG. 5 the output from the CCD sensor may be applied directly to the A/D converter or indirectly via a sample/hold amplifier 16. The black reference level for the video samples is held by the sample/hold amplifier 16 to provide the reference voltage for the A/D converter during the current line scan. This obviates the need for any DC offset adjustment or compensation for thermally induced drift during operation. The form of the circuit shown in FIG. 6a is appropriate to a single-output CCD sensor. For dual-output odd/even types 2 sample/hold amplifiers are used, and the reference and input ports of the A/D converter are electronically switched to the appropriate forth for each sample.

Using typical CCD sensors an exposure time of one mS is required. At 400 characters per inch resolution this equates to a maximum scan rate of 2.5 inch per second, but this scan rate may be increased if lower density strips are used.

The image buffer 15 is formed by a MB DRAM. The output from the DRAM is applied to a digital signal processor DSP and from there to the image resampling sequencer which carries out the necessary transforms to correct for the skew angle of the strip with respect to the CCD sensors.

The TRW TMC2301 Image resampling Sequencer is used to control the geometric transformation needed to deskew the raw image. The device executes a general second-order transform, $(u, v) \mapsto (x,y)$ but since the required transform is a pure shear parallel to the y-axis, a much-simplified description will suffice.

In the case where all second derivatives are zero, the TMC2301 performs the linear transform, $$x = Xc + Au + Bv,$$

where
$A = dx/du,$
$B = dx/dv$

Normally, the TCM2301 is used in pairs, with one device handling the row transformation $x(u,v)$ and the other handling the column transformation $y(u,v)$. However, we can take advantage of the specific nature of the required transform to eliminate one device.

The required transform is, $$x = u$$

$$y = Vo + Au$$

We can program a single device in row mode to perform, $$x = Vo + Au$$

Then, writing X=u Y=x, we have, $$X = u$$

$$Y = Vo + Au$$

as required.

Since this technique to eliminate one device relies on the fact that only one of the two dimensions is mapped in a non-trivial way, we term it a '1½-dimensional' transform.

Initial coarse determination of image skew is made by starting with zero skew angle and counting the number of scans between first detecting a part of the strip header and the first scan which completely crosses it. This gives the tangent of the skew angle directly, as required for programming the TMC2301.

Subsequent tracking of skew is maintained by examining the odd/even markers at the beginning and end of each strip data line and classifying them as changed/unchanged/unreadable. Whenever the marker at one end of the line changes before the other, it indicates a potential error in skew angle. Very small changes are regarded as noise and ignored; otherwise, the transform, coefficients are adjusted by a small amount and the line resampled. This is repeated until either synchronisation is achieved or a rate-of-change-of-skew limit is reached. In the latter case, it is assumed that the line markers are damaged and skew is restored to its previous value. However, it may actually be the case that the strip has not been scanned cleanly, and the image is indeed discontinuous at the current point. This situation will not be detected until the line data is decoded.

Scan lines are decoded by measuring the distance between successive positive and negative peaks in the rate of change of signal intensity, that is black/white and white/black transition. Because of the way strip data is encoded, valid transitions must be separated by exactly one or two unit distances. To compensate for black or white areas spreading during printing, a compensation factor is added or subtracted depending on the average black/white ratio (a valid strip has almost exactly 50% black/white ratio). Below a threshold, very narrow regions are considered as noise and ignored. It is then possible to classify the width of a black or white cell as valid (1 or 2 units), invalid wide or invalid narrow. If all cells in a line are valid, the line is decoded and the parity bits checked; if some cells are invalid, the parity may be used to estimate their correct value, but at the expense of error-detection.

Each scan line is given a score, depending on whether it needed reconstruction, its parity checks, and other quality-related features. When the data line odd/even markers change, indicating that scans are now for a new data line, the data from the scan line with the best score (or the middle one if more than one scan line has the highest score) is output as the decoded value of the last data line. As standard, if any data line cannot be reliably decoded, the strip is rejected, but the minimum acceptable score may be varied to allow 'best-guess' data through.

Certain systematic errors in the printing of SOFT-STRIPS leads to predictable and reversable damage to the strip. When reading fails, the image is examined for signs of such known distortions and an inverse transformation is applied to the decoding parameters. Subsequent-reading may then decode even a badly misprinted strip. All decoding and communications parameters are stored in non-volatile RAM 17 and are adaptably varied to match the conditions in which the reader is used. Thus the reader retains the ability automatically to detect and decode all variations in strip density but first-read rate is improved in the more common case that all strips being read have the same characteristics.

I claim:

1. An optical reader for reading high density dibit encoded data from a data strip, said optical reader comprising:
   an optical detector; and
   means, connected to said optical detector, for decoding an output from said optical detector, said optical detector including photo-sensitive means arranged to extend transversely across a row of dibits thereby to form an image of said row of dibits, and said means connected to said optical detector including:
      buffer means for storing said image of said row of dibits and
      image transform means, operatively connected to said buffer means, for detecting a skew angle of said reader relative to said data strip and for applying a shear transformation to said image of said row of dibits stored in said buffer means thereby compensating for distortion of said image in accordance with said skew angle.

2. The reader of claim 1, wherein said optical detector comprises a CCD array.

3. An optical reader for reading high density dibit encoded data from a data strip, said optical reader comprising:
   an optical detector; and
   means, connected to said optical detector, for decoding an output from said optical detector, said optical detector including photo-sensitive means arranged to extend transversely across a row of dibits thereby to form an image of said row of dibits, and said means connected to said optical detector including:
      buffer means for storing said image of said row of dibits and
      image transform means, operatively connected to said buffer means, for detecting a skew angle of said reader relative to said data strip and for applying a shear transformation to said image of said row of dibits stored in said buffer means thereby compensating for distortion of said image in accordance with said skew angle,
   wherein said image transform means include an image resampling sequencer for receiving image data from said buffer means and applying to said image data a transform:

$$Y = V_0 + Au$$

each point (u,v) in the raw data thereby being mapped to (X,Y) in the transformed data, where (u,v) and (X,Y) are lateral and longitudinal coordinates of raw image data stored in said buffer means and transformed image data respectively, where Y is as defined above and X=u.

4. The reader of claim 3, wherein said data strip includes a data strip header, said header including a first portion on one side of said data strip and a second portion on an other side of said data strip, said image transform means include means for detecting said first portion of said data strip header in an imaged row and counting the number of scans between said first appearance of said data strip header and a subsequent first scan which completely crosses said second portion of said header, said image transform means thereby determining an appropriate initial value for transform coefficient A.

5. The reader of claim 3, wherein said decoder means include means for detecting transitions during the reading of data in alignment dibits bounding transformed row images and for adding a predetermined correction to said transform coefficient A when a transition is detected in one end only of a transformed row image, said decoder means then resampling and transforming said current row.

6. An optical reader for reading high density dibit encoded data from a data strip, said optical reader comprising:

an optical detector; and means, connected to said optical detector, for decoding an output from said optical detector, said optical detector including photo-sensitive means arranged to extend transversely across a row of dibits thereby to form an image of said row of dibits, and said means connected to said optical detector including:

buffer means for storing said image of said row of dibits; and image transform means, operatively connected to said buffer means, for detecting a skew angle of said reader relative to said data strip and for applying a shear transformation to said image of said row of dibits stored in said buffer means thereby compensating for distortion of said image in accordance with said skew angle, further comprising an A/D converter for digitizing signals from said optical detector and for providing an output to said buffer means, and means for detecting a reference output by said optical detector and for setting a reference voltage for said A/D converter accordingly.

7. A hand-held optical reader for reading high density dibit encoded data from a data strip comprising:

an optical detector for imaging successive rows of dibits as said reader is moved along said data strip in contact with said strip, a light source offset from a region of contact between said reader and said strip and arranged to illuminate said region of contact, means connected to said optical detector for decoding an output from said optical detector, buffer means for storing an output from said detector image, and image transform means for detecting a skew angle of said reader relative to said strip and for applying a shear transformation to said image of said row of dibits stored in said buffer means, thereby to compensate for distortion of said image in accordance with said skew angle.

8. The reader of claim 7, wherein said optical detector comprises a CCD array.

9. A hand-held optical reader for reading high density dibit encoded data from a data strip comprising:

an optical detector for imaging successive rows of dibits as said reader is moved along said data strip in contact with said strip, a light source offset from a region of contact between said reader and said strip and arranged to illuminate said region of contact, means connected to said optical detector for decoding an output from said optical detector, buffer means for storing an output from said detector image, and image transform means for detecting a skew angle of said reader relative to said strip and for applying a shear transformation to said image of said row of dibits stored in said buffer means, thereby to compensate for distortion of said image in accordance with said skew angle, wherein said image transform means include an image resampling sequencer for receiving image data from said buffer means and applying to said image data a transform:

$$Y = V_0 + Au$$

each point $(u,v)$ in the raw data thereby being mapped to $(X,Y)$ in the transformed data, where $(u,v)$ and $(X,Y)$ are lateral and longitudinal coordinates of raw image data stored in said buffer means and transformed image data respectively, where Y is as defined above and $X = u$.

10. The reader of claim 9, wherein said data strip includes a data strip header, said header including a first portion on one side of said data strip and a second portion on an other side of said data strip, said image transform means include means for detecting said first portion of said data strip header in an imaged row and counting the number of scans between said first appearance of said data strip header and a subsequent first scan which completely crosses said second portion of said header, said image transform means thereby determining an appropriate initial value for transform coefficient A.

11. The reader of claim 9, wherein said decoder means include means for detecting transitions during the reading of data in alignment dibits bounding transformed row images and for adding a predetermined correction to said transform coefficient A when a transition is detected in one end only of a transformed row image, said decoder means then resampling and transforming said current row.

12. A hand-held optical reader for reading high density dibit encoded data from a data strip comprising:

an optical detector for imaging successive rows of dibits as said reader is moved along said data strip in contact with said strip, a light source offset from a region of contact between said reader and said strip and arranged to illuminate said region of contact, means connected to said optical detector for decoding an output from said optical detector, buffer means for storing an output from said detector image, and image transform means for detecting a skew angle of said reader relative to said strip and for applying a shear transformation to said image of said row of dibits stored in said buffer means, thereby to compensate for distortion of said image in accordance with said skew angle, further comprising an A/D converter for digitizing signals from said optical detector and for providing an output to said buffer means, and means for detecting a reference output by said optical detector and for setting a reference voltage for said A/D converter accordingly.

* * * * *